(12) United States Patent
Zhang

(10) Patent No.: US 9,247,035 B1
(45) Date of Patent: Jan. 26, 2016

(54) TWISTED CASE

(71) Applicant: Jun Pao Zhang, Swansea, MA (US)

(72) Inventor: Jun Pao Zhang, Swansea, MA (US)

(73) Assignee: Luca D'Ottone, Miami, FL (US)

( * ) Notice: Subject to any disclaimer, the term of this patent is extended or adjusted under 35 U.S.C. 154(b) by 0 days.

(21) Appl. No.: 14/569,753

(22) Filed: Dec. 14, 2014

Related U.S. Application Data

(60) Provisional application No. 61/946,755, filed on Mar. 1, 2014.

(51) Int. Cl.
*H04M 1/02* (2006.01)

(52) U.S. Cl.
CPC .................................. *H04M 1/0202* (2013.01)

(58) Field of Classification Search
USPC .................................... 455/575.1, 100, 575.8
See application file for complete search history.

(56) References Cited

U.S. PATENT DOCUMENTS

| | | | |
|---|---|---|---|
| 8,290,547 B2 | 10/2012 | Cataldo et al. | |
| 2002/0030103 A1* | 3/2002 | Wycherley et al. | 235/439 |
| 2007/0167197 A1* | 7/2007 | Fuke et al. | 455/575.1 |
| 2011/0233078 A1 | 9/2011 | Monaco et al. | |
| 2011/0255259 A1* | 10/2011 | Weber et al. | 361/807 |
| 2012/0225701 A1 | 9/2012 | Cataldo et al. | |
| 2013/0129138 A1 | 5/2013 | Washington, Jr. | |
| 2013/0148839 A1 | 6/2013 | Stevinson | |
| 2013/0265702 A1 | 10/2013 | Merenda | |

* cited by examiner

*Primary Examiner* — Kabir A Timory
(74) *Attorney, Agent, or Firm* — Luca D'Ottone; KB Patents

(57) ABSTRACT

The inventive device disclosed in the present application is a new case for iPhone 5 which has a built-in cable holder along one side of the phone. The holder is on the side opposite the volume and vibration controls. The user leaves their headphones plugged in and attached to their phone, wraps the headphone cable between the two prongs on the side of the case, and clips the ear buds into the earphone clip at the top. It is emphasized that this abstract is provided to comply with the rules requiring an abstract that will allow a searcher or other reader to quickly ascertain the subject matter of the technical disclosure.

2 Claims, 4 Drawing Sheets

US 9,247,035 B1

TWISTED CASE

CLAIM OF PRIORITY FROM RELATED APPLICATIONS

The present application claims priority from U.S. Provisional Patent Application No. 61/946,755 filed on Mar., 1 2014 to Jun Pao Zhang from Swansea, Mass. (US), directed to a TWISTED CASE, that is hereby incorporated by reference.

BACKGROUND OF THE INVENTION

1. Field of the Invention

The inventive device disclosed in the present application generally relates to a new case for iPhone 5 which has a built-in cable holder along one side of the phone. The iPhone 5 is a portable cellular phone developed by APPLE, Inc. a U.S. Corporation from Cupertino (Calif.). The holder is on the side opposite the volume and vibration controls. The user leaves their headphones plugged in and attached to their phone, wraps the headphone cable between the two prongs on the side of the case, and clips the ear buds into the earphone clip at the top.

2. Brief Description of the Prior Art iPhone cases and accessories are well known in the art. Various Patents and Published Patent applications are in fact directed to spittoons. While developing the invention of the instant application independently the Inventor researched extensively the public record as well as the current market for spittoons and the most relevant examples found in the search are mentioned in the Information Disclosure Statement (IDS) attached.

Despite all the efforts listed above prior art patents describe structures that are either not truly convenient or else involve complicated, expensive, and overly difficult assembly and/or disassembly parts and procedures. Other devices have been advertised on various media but never patented or described into a printed publication.

SUMMARY OF THE INVENTION

The invention is a new case for mobile phones, including iPhones, which has a built-in cable holder along one side of the phone. The holder is on the side opposite the volume and vibration controls. The user leaves their headphones plugged in and attached to their phone, wraps the headphone cable between the two prongs on the side of the case, and clips the ear buds into the earphone clip at the top.

It is then the principal object of the present invention is to provide a convenient way to carry headphones with the iPhone 5, allowing for easy access to the iPhone.

It is a secondary objective of the present invention to eliminate having to unwrap headphones from around the phone when wanting to use it for texting, emailing or playing a game.

It is an additional objective of the present invention to eliminate spending time untangling headphones when they are carried in one's pocket or purse.

These and other objective achieved by the device of the present invention will be apparent by the drawings, by their detailed description, and by the specification here from appended.

DESCRIPTION OF THE PREFERRED EMBODIMENT

Figure 1:
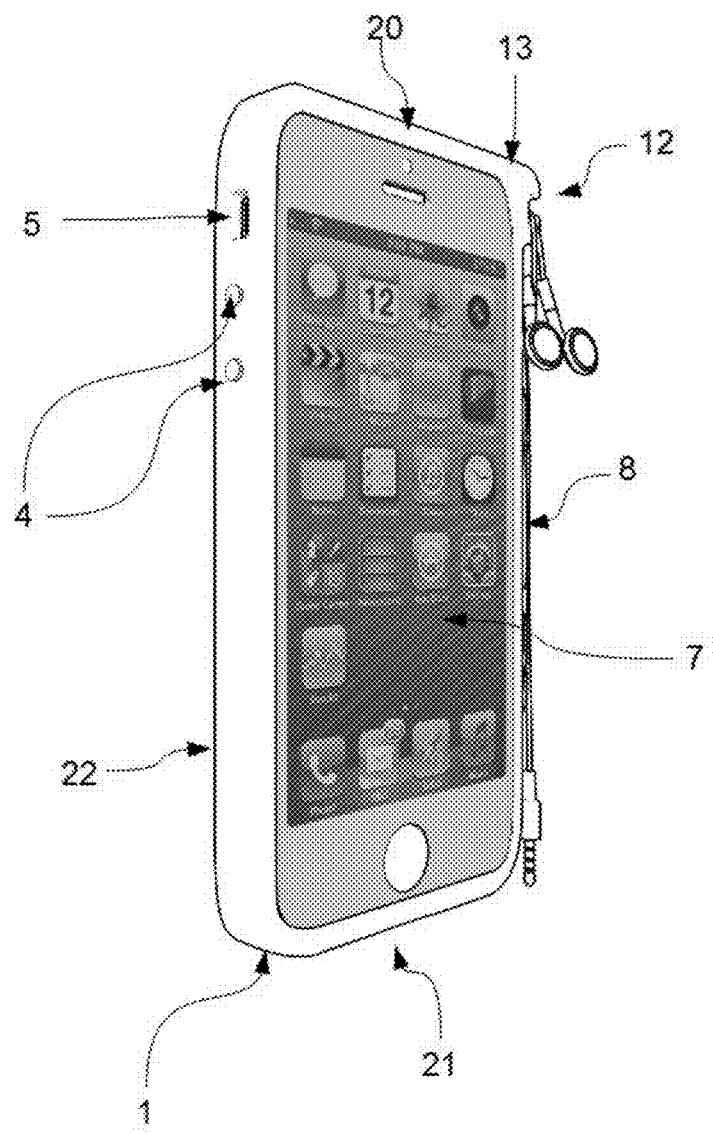
FIG. 1 is a front perspective view of a first preferred embodiment of the "Twisted Case" in accordance with the teaching of the present invention.
Figure 2:
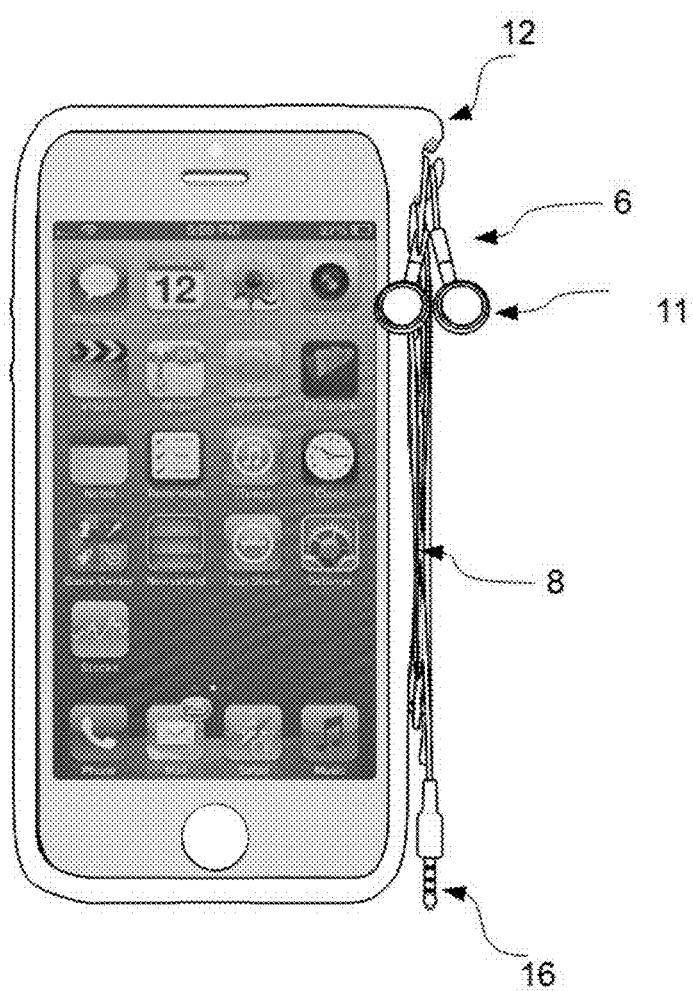
FIG. 2 is a front elevation view of the preferred embodiment of the "Twisted Case" of FIG. 1 and all its features including the side headset.
Figure 3:
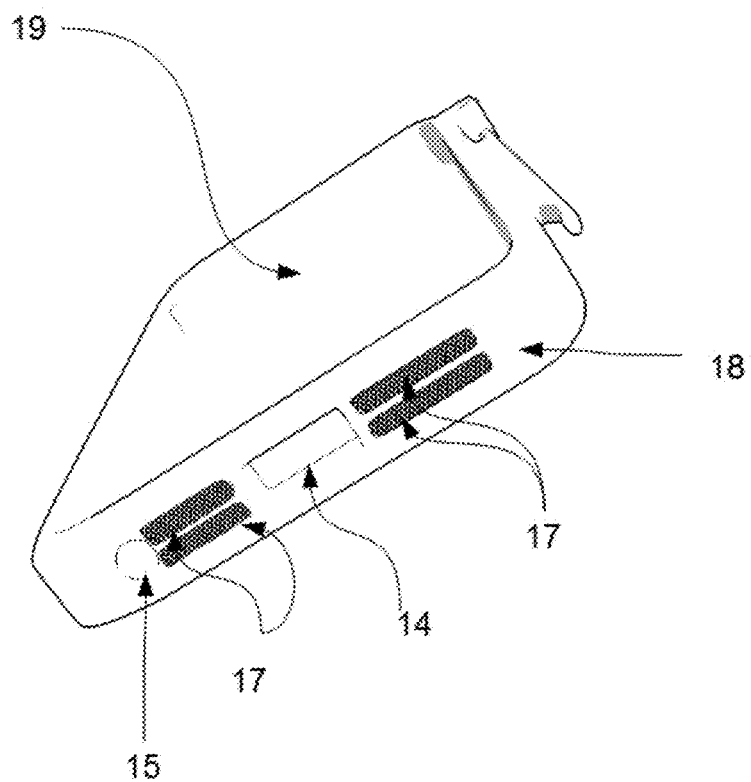
FIG. 3 is a bottom back side perspective view of the preferred embodiment of the "Twisted Case" of FIG. 1.
Figure 4:
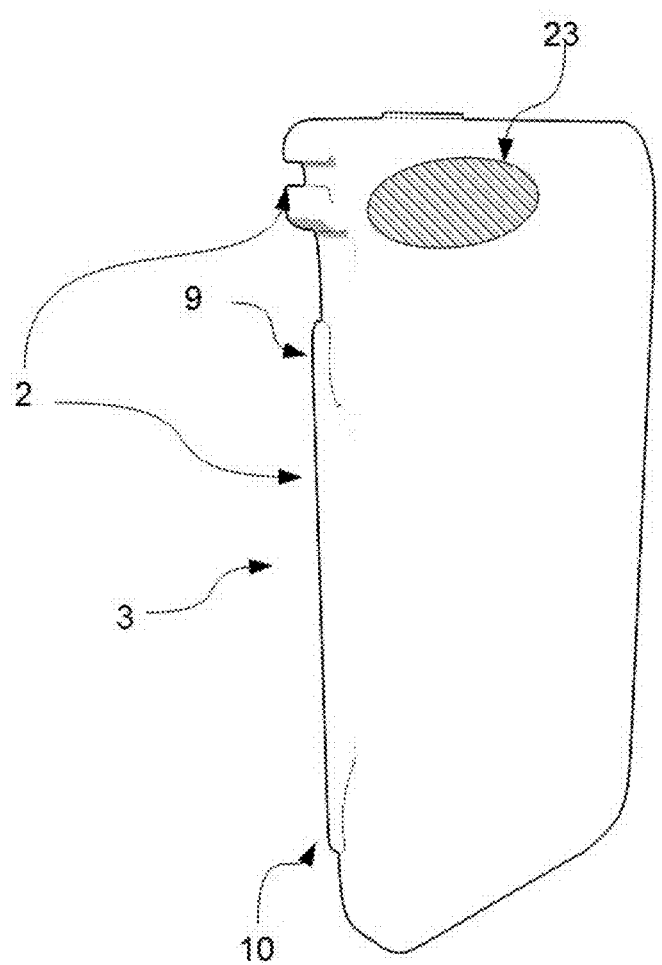
FIG. 4 is a back lateral perspective view of the preferred embodiment of the "Twisted Case" of FIG. 1 without the headset.

The invention is a new phone case (1) for cellular phones including the famous iPhone 5 which has a built-in cable holder (2) comprising a up prong (9), a down prong (10) and a clip (12); where said cable holder (2) is along the left side (3) of the phone case (1). Said cable holder (2) is on the side opposite of the volume control (4) and vibration control (5). The user leaves their headphones (6) plugged in and attached to their phone (7), wraps the headphone cable (8) between the two prongs (9, 10) (up prong (9) and down prong (10) on the left side (3) of the phone case (1), and clips the ear buds (11) into the earphone clip (12) at the corner left top (13) of the phone case (1).

As it can be inferred from the drawings essential elements of the "Twisted Case" of the present invention include: a headphone cable (8), an set of ear buds (11), a cable holder (2), button bumps (4 & 5), an cellular phone (7) such as iPhone 5, a flat hole (14) for the charging connection, an auxiliary hole (15) to accommodate the plug (16) of said headphone cable (8), a plurality of vent holes (17), and a phone case (1).

With the Twisted Case, headphones (6) are secured to the left side (3) of the phone case (1), and the user has full access to use all the functions on their phone (7). There are openings along the bottom side (18) of the phone case (1) so the phone's speakers are not blocked or muffled, as well as appropriately places openings on the other side and top of the case so the user can access the volume control button, the vibration switch, and the phone lock button. When wanting to use the headphones, they can be quickly unwrapped without having to be untangled.

In one of its preferred embodiments the phone case (1) for a cellular phone comprises a rectangular back base member (19) to which a top side (20), a bottom side (21), a left side (3), and a right side (22) are perpendicularly attached; where said rectangular base member has an ogival opening (23) in correspondence of the intersection of said rectangular back base member (19) with said top side (19) and said left side (3); where said phone case (1) has a built-in cable holder (2) of said left side (2); two volume control buttons (4) on the portion of said right side (22) close to said top side (20), and a vibration control button still on said right side (22) in between said volume control buttons (4) and said top side (20); and a flat hole (14) for the charging connection, generally located in the middle of said bottom side (21); a plurality of vent holes (17), symmetrically located around said flat hole (14) for the charging connection, and an auxiliary hole (15) to accommodate a plug (16) of a headphone cable (8). The built-in cable holder (2) may further comprise: a up prong (9), a down prong (10), symmetrically located along said left side (3) and a clip (12) located close to the intersecting line between said left side (3) and said top side (20). An additional button may be provided on the top side.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A phone case for a cellular phone comprising:
   a. a rectangular back base member to which a
   b. top side,
   c. a bottom side,
   d. a left side,
   e. and a right side are perpendicularly attached; where said rectangular base member has an
   f. ogival opening in correspondence of an intersection of said rectangular back base member with said top side and said left side; where said phone case has a
   g. built-in cable holder on said left side;
   h. two volume control buttons on a portion of said right side close to said top side, and
   i. a vibration control button still on said right side in between said two volume control buttons and said top side; and
   l. a flat hole for a charging connection, generally located in said bottom side;
   m. a plurality of vent holes, symmetrically located around said flat hole for the charging connection, and
   n. an auxiliary hole to accommodate a plug of a headphone cable.

2. The phone case for a cellular phone of claim 1 where said built-in cable holder further comprises:
   o. a up prong,
   p. a down prong, symmetrically located along said left side and
   q. a clip located close to the intersecting line between said left side and said top side.

* * * * *